(12) United States Patent
Song et al.

(10) Patent No.: US 10,946,554 B2
(45) Date of Patent: Mar. 16, 2021

(54) PREPREG MANUFACTURING DEVICE AND PREPREG MANUFACTURING METHOD USING SAME

(71) Applicant: LG Hausys, Ltd., Seoul (KR)

(72) Inventors: Kang-Hyun Song, Anyang-si (KR); Jong-Sung Park, Daejeon (KR); Hee-June Kim, Seongnam-si (KR); Hee-Jung Lee, Anyang-si (KR); Young-E Moon, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 274 days.

(21) Appl. No.: 16/074,946

(22) PCT Filed: Dec. 27, 2016

(86) PCT No.: PCT/KR2016/015308
§ 371 (c)(1),
(2) Date: Aug. 2, 2018

(87) PCT Pub. No.: WO2017/135574
PCT Pub. Date: Aug. 10, 2017

(65) Prior Publication Data
US 2019/0030759 A1    Jan. 31, 2019

(30) Foreign Application Priority Data

Feb. 3, 2016    (KR) .................. 10-2016-0013219

(51) Int. Cl.
| B29B 15/12 | (2006.01) |
| C08J 5/24 | (2006.01) |
| B29B 15/10 | (2006.01) |
| B29C 70/54 | (2006.01) |
| B29C 70/34 | (2006.01) |
(Continued)

(52) U.S. Cl.
CPC ............ *B29B 15/122* (2013.01); *B29B 15/10* (2013.01); *B29C 33/0077* (2013.01);
(Continued)

(58) Field of Classification Search
CPC ... B29B 15/122; B29B 15/10; B29C 33/0077; B29C 70/345; B29C 70/54; B29C 70/50;
(Continued)

(56) References Cited

U.S. PATENT DOCUMENTS 4,883,625 A * 11/1989 Glemet ................ B29C 48/154
264/136
2013/0136890 A1 * 5/2013 Maliszewski .......... B29B 11/10
428/113

FOREIGN PATENT DOCUMENTS

CN    202357450 U    8/2012
CN    102941722 A    2/2013
(Continued)

OTHER PUBLICATIONS

International Search Report dated Feb. 28, 2017, corresponding to International Application No. PCT/KR2016/015308.
(Continued)

*Primary Examiner* — Matthew J Daniels
*Assistant Examiner* — Gregory Chad Grosso
(74) *Attorney, Agent, or Firm* — Hauptman Ham, LLP

(57) ABSTRACT

Disclosed are a prepreg manufacturing device and a prepreg manufacturing method using the same. A prepreg manufacturing device according to an embodiment of the present invention comprises: a first resin inflow part which is formed inside an upper mold, receives a resin supplied from an extruder, and discharges the resin to a reinforced fiber flowing to a lower part in the upper mold; and a second resin inflow part which is formed inside a lower mold, receives the resin supplied from the extruder, and discharges the resin to the reinforced fiber flowing to an upper part of the lower mold.

4 Claims, 2 Drawing Sheets

(51) Int. Cl.
  *B29C 33/00* (2006.01)
  *B29K 307/04* (2006.01)
  *B29K 309/08* (2006.01)
(52) U.S. Cl.
  CPC ............ *B29C 70/345* (2013.01); *B29C 70/54* (2013.01); *C08J 5/24* (2013.01); *B29K 2307/04* (2013.01); *B29K 2309/08* (2013.01)
(58) Field of Classification Search
  CPC ...... B29C 70/523; C08J 5/24; B29K 2307/04; B29K 2309/08
  USPC .......................................................... 264/299
  See application file for complete search history.

(56) References Cited

FOREIGN PATENT DOCUMENTS

| | | |
|---|---|---|
| CN | 105313347 A | 2/2016 |
| EP | 1 555 104 A1 | 7/2005 |
| EP | 1 715 993 A1 | 11/2006 |
| JP | H09136344 A | 5/1997 |
| JP | 2007223217 A | 9/2007 |
| JP | 2010214878 A | 9/2010 |
| JP | 2013075471 A | 4/2013 |
| KR | 1020010048600 A | 6/2001 |
| KR | 1020110058103 A | 6/2011 |
| KR | 1020110069234 A | 6/2011 |
| KR | 1020120042767 A | 5/2012 |
| KR | 1020130069944 A | 6/2013 |
| KR | 1020130105017 A | 9/2013 |
| WO | 89/09686 A1 | 10/1989 |

OTHER PUBLICATIONS

The extended European Search Report for 16889551.4 dated Oct. 4, 2018.
Chinese Office Action dated Apr. 20, 2020 in connection with the Chinese Patent Application No. 201680080995.4.

* cited by examiner

PREPREG MANUFACTURING DEVICE AND PREPREG MANUFACTURING METHOD USING SAME

CROSS REFERENCE TO RELATED APPLICATION

This present application is a national stage filing under 35 U.S.C § 371 of PCT application number PCT/KR2016/015308 filed on Dec. 27, 2016 which is based upon and claims the benefit of priority to Korean Patent Application No. 10-2016-0013219 filed on Feb. 3, 2016 in the Korean Intellectual Property Office. The disclosures of the above-listed applications are hereby incorporated by reference herein in their entirety.

TECHNICAL FIELD

The present invention relates to a prepreg manufacturing device and a prepreg manufacturing method using the same and, more specifically, to a prepreg manufacturing device which impregnates all of a prepreg uniformly with a resin and reduces a vertical impregnation ratio deviation, and a prepreg manufacturing method using the prepreg manufacturing device.

BACKGROUND ART

Generally, a fiber reinforced composite material refers to a material which is made by binding at least two materials, and a representative example includes a material in which a reinforcement material such as a glass, a carbon fiber, etc. is impregnated with a mother material such as a resin (e.g., a polymer resin, etc.).

Recently, more and more interest is paid in a continuous fiber reinforced composite material among many fiber reinforced composite materials.

The continuous fiber reinforced composite material refers to a composite material which is prepared by impregnating the reinforced fiber continuously with the mother material in contrast to a conventional short fiber reinforced composite material or a long fiber reinforced composite material. Thanks to this feature, during a preparation process, a higher ratio of the reinforcement material can be impregnated with the continuous fiber reinforced composite material than the conventional short fiber reinforced composite material or the long fiber reinforced composite material, which results in an advantage of guaranteeing a higher degree of mechanical property than the conventional materials.

This continuous fiber reinforced composite material is prepared by a weaving or stacking method and the stack type continuous fiber reinforced composite material of the continuous fiber reinforced composite material is formed by stacking unidirectional reinforced continuous fiber prepregs in various directions and applying heat on the stack.

In the meantime, uniformity in upper and lower surfaces of the prepreg as well as an increase in the impregnation ratio between the reinforced fiber and the resin are crucial in preparing the unidirectional reinforced continuous fiber prepregs which are used in forming the stack type composite material.

FIG. 1 is a conceptual diagram which schematically illustrates an impregnation mold used for preparing a conventional prepreg.

When referring to FIG. 1, most of the conventional impregnation mold is made in a tube type; more specifically, a tube type upper portion 30 is formed inside an upper mold 10 and a resin R is introduced into one side of the tube type upper portion 30. The introduced resin R flows toward the blocked other side of the tube type upper portion 30 and is discharged downwards.

In this case, when the conventional method is adopted, it is difficult to adjust an discharge amount of the resin R within the impregnation mold due to a flow type of the resin R.

For example, a relatively large amount of resin can be discharged at a front end 10a of the upper mold, where the resin is introduced, and the discharge amount of the resin can be decreased when the resin flows towards the end portion 10b of the upper mold. Therefore, the resin cannot be impregnated uniformly.

Furthermore, most of the resin R is discharged through the upper mold 10 in the conventional method, and a deviation can occur in the impregnation ratio of the resin due to a vertical position difference in the prepreg. This could degrade the physical property of the continuous fiber reinforced composite material.

The prior art related to the present invention includes a Korea Patent Publication No. 10-2001-0048600 which is published on Jun. 15, 2001 and discloses a matrix resin composition and a prepreg for a fiber reinforced composite, and the fiber reinforced composite material.

DETAILED DESCRIPTION OF THE INVENTION

Technical Problem

The objective of the present invention is to provide a prepreg manufacturing device which enables a uniform impregnation of a resin within an impregnation mold and reduces a vertical impregnation ratio deviation, and a prepreg manufacturing method using the prepreg manufacturing device.

The objectives to be solved by the present invention are not limited to the aforementioned objective(s), and other objective(s) which are not clearly noted here can be clearly understood by a skilled artisan based on the description to be followed.

Technical Solution

The prepreg manufacturing device according to an embodiment of the present invention comprises a first resin inflow part which is formed inside an upper mold, receives a resin supplied from an extruder, and discharges the resin to a reinforced fiber flowing to a lower part in the upper mold; and a second resin inflow part which is formed inside a lower mold, receives the resin supplied from the extruder, and discharges the resin to the reinforced fiber flowing to an upper part of the lower mold.

Each of the first resin inflow part and the second resin inflow part can have a shape whose cross-section size at an outlet side where the resin is discharged is expanded compared to the cross-section size at an inlet side to which the resin is supplied from the extruder.

Also, each of the first resin inflow part and the second resin inflow part can have a triangular cross-section shape. As a specific example, the shape can be a triangle whose two sides are straight lines, or the triangle can have two sides which are rounded to be concave down or convex up. However, the examples are not restricted to these shapes.

Also, the first resin inflow part and the second resin inflow part can have symmetrical shapes which face each other.

In addition, the first resin inflow part and the second resin inflow part can be connected with each other at the same time through a resin supply line which is branched off from the extruder.

Also, the prepreg manufacturing device comprises temperature control parts which control temperatures at a plurality of divided sections defined in a length direction for each of the first resin inflow part and the second resin inflow part.

A prepreg manufacturing method according to another embodiment of the present invention uses the prepreg manufacturing device according to the present invention and comprises a step (a) in which a resin is supplied from the extruder to each of the first resin inflow part and the second resin inflow part; and a step (b) in which the resin is discharged uniformly from each of the first resin inflow part and the second resin inflow part toward a reinforced fiber which flows between the upper mold and the lower mold.

After the step (b), the prepreg manufacturing method further comprises a step (c) in which temperatures at a plurality of divided sections defined in a length direction for each of the first resin inflow part and the second resin inflow part are controlled.

Advantageous Effects

According to embodiments of the invention, a resin can be impregnated uniformly in an impregnation mold.

Also, according to the embodiments of the present invention, a vertical impregnation ratio deviation in a prepreg can be reduced.

Therefore, physical properties of a continuous fiber reinforced composite material can be improved, and degradation in workability due to a fiber exposure can be prevented by improving quality of upper and lower surfaces of the prepreg.

BEST MODE

In the following, preferred embodiments of the present invention will be explained in detail by referring to the appended figures.

It is to be noted that the present invention is not restricted to the embodiments disclosed in the following and can be realized in various different configurations, and the embodiments are provided to fully disclose the present invention and help a person with an ordinary skill in the art completely understand the categories of the present invention.

A fiber reinforced composite material refers to a material which is made by binding at least two materials, and a representative example is a material in which a reinforcement material such as a glass, a carbon fiber, etc. is impregnated with a mother material such as a resin (e.g., a polymer resin, etc.).

Among various fiber reinforced composite materials, a continuous fiber reinforced composite material refers to a composite material which is prepared by impregnating the reinforced fiber continuously with the mother material in contrast to a conventional short fiber reinforced composite material or a long fiber reinforced composite material.

More specifically, a higher ratio of the reinforcement material can be impregnated in the continuous fiber reinforced composite material than the conventional short fiber reinforced composite material or the long fiber reinforced composite material, which results in an advantage of guaranteeing a higher degree of mechanical property than conventional materials.

For example, the stack type continuous fiber reinforced composite material is formed by stacking unidirectional reinforced continuous fiber prepregs (referred to as 'prepregs', hereinafter) in various directions and binding the prepregs. And, a resin impregnation ratio in the reinforced fiber within the impregnation mold is crucial in a process using the prepregs.

Figure 1:
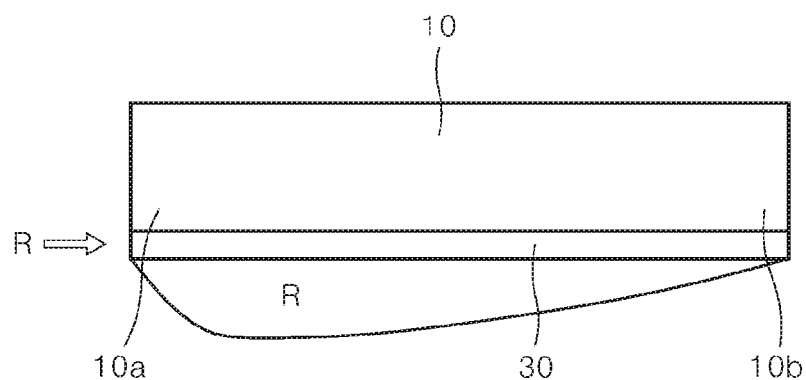
FIG. 1 is a conceptual diagram which schematically illustrates an impregnation mold used for preparing a conventional prepreg.
Figure 2:
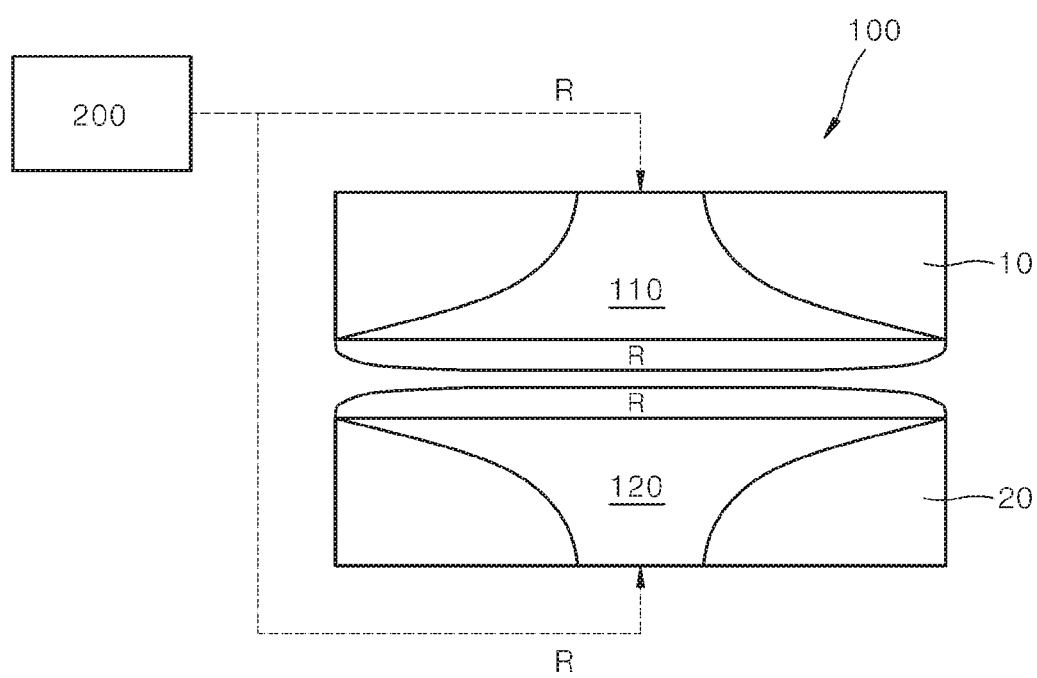
FIG. 2 is a conceptual diagram which schematically illustrates the prepreg manufacturing device according to an embodiment of the present invention.

FIG. 2 is a conceptual diagram which schematically illustrates the prepreg manufacturing device according to an embodiment of the present invention.

When referring to FIG. 2, the prepreg manufacturing device 100 according to an embodiment of the present invention comprises an impregnation mold having an upper mold 10 and a lower mold 20, and a first resin inflow part 110 and a second resin inflow part 120 which receive the resin supplied by the extruder 200.

The first resin inflow part 110 can be formed inside the upper mold 10.

More specifically, the first resin inflow part 110 corresponds to an inflow space inside the upper mold 10 to which the resin, which is supplied from the extruder 200, is introduced.

The resin, which has been introduced into the first resin inflow part 110, is discharged downwards from the upper mold 10, and, more specifically, can be discharged onto an upper surface of the reinforced fiber (not shown) which flows to a lower part in the upper mold 10.

When referring to FIG. 2 it can be acknowledged that the resin R is discharged uniformly under the first resin inflow part 110.

Meanwhile, the first resin inflow part 110 can have a shape whose cross-section size at an outlet side where the resin is discharged is expanded compared to the cross-section size at an inlet side to which the resin, which has been supplied from the extruder 200, is introduced.

As a preferred embodiment, the first resin inflow part 110 can have a triangular cross-section shape. As a specific example, the shape can be a triangle whose two sides are straight lines, or the triangle can have two sides which are rounded to be concave down or convex up.

However, the examples are not restricted to these shapes. Although not shown separately, the first resin inflow part 110 can have various cross-section shapes.

The second resin inflow part 120 can be formed inside the lower mold 20.

More specifically, the second resin inflow part 120 corresponds to an inflow space inside the lower mold 10 to which the resin, which is supplied from the extruder 200, is introduced.

The resin, which has been introduced into the second resin inflow part 120, is discharged upwards from the lower mold 20, and, more specifically, can be discharged onto a lower surface of the reinforced fiber (not shown) which flows between the upper mold 10 and the lower mold 20.

When referring to FIG. 2 it can be acknowledged that the resin R is discharged uniformly under the second resin inflow part 120.

According to the embodiment of the present invention, the prepreg manufacturing device is configured as described, and there is no vertical deviation in the resin impregnation ratio between upper and lower positions of the reinforced fiber. Therefore, the physical properties of the continuous fiber reinforced composite material can be greatly improved.

Meanwhile, the second resin inflow part 120 can have a shape whose cross-section size at an outlet side where the resin is discharged is expanded compared to the cross-section size at an inlet side to which the resin, which has been supplied from the extruder 200, is introduced.

As a preferred example, the second resin inflow part 120 can have the cross-sections with the same size and shape as those of the aforementioned first resin inflow part 110; however, the size and shape of the second resin inflow part are not restricted to this. Therefore, although not shown separately, the second resin inflow part 120 can have various cross-section shapes such as a triangle, etc.

Also, the second resin inflow part 120 can have a shape which is symmetrical to and faces that of the first resin inflow part 110.

Also, the resin can be supplied from the extruder 200 to the first resin inflow part 110 and the second resin inflow part 120 at the same time. In order to accomplish this, the supply line through which the resin R is supplied from the extruder 200 can be formed to be branched off towards the first and second resin inflow parts 110, 120.

Figure 3:
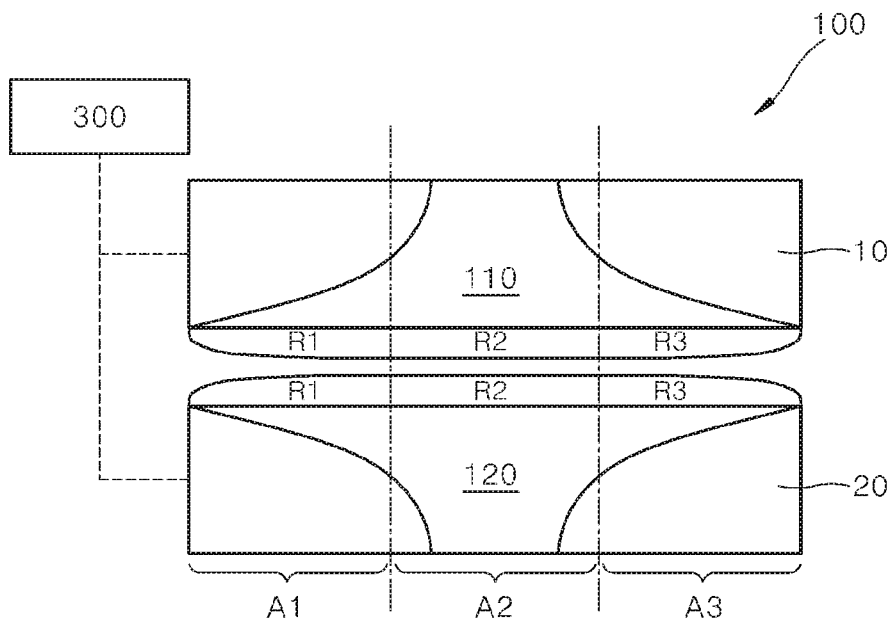
FIG. 3 is a conceptual diagram which describes a temperature adjusting arrangement of the prepreg manufacturing device according to an embodiment of the present invention.

FIG. 3 is a conceptual diagram which describes a temperature adjusting arrangement of the prepreg manufacturing device according to an embodiment of the present invention.

When referring to FIG. 3, the prepreg manufacturing device 100 according to an embodiment of the present invention includes a temperature control part 300.

By using the temperature control part 300, the temperatures at a plurality of (e.g., three) divided sections A1, A2, A3, which are defined in a length direction for each of the first resin inflow part 110 and the second resin inflow part 120, can be adjusted separately.

For example, when it is determined that the discharge amounts for the resins R1, R3, which are discharged at the A1 section and the A3 section of the first resin inflow part 110 and the second resin inflow part 120, are small, it is possible to increase the discharge amounts of the resins R1, R3, which are discharged at those sections, by increasing the temperatures at the A1 section and the A3 section.

Also, when it is determined that the discharge amounts for the resin R2, which is discharged at the A2 section of the first resin inflow part 110 and the second resin inflow part 120, are excessively large, it is possible to decrease the discharge amount of the resin R2, which is discharged at the corresponding section, by decreasing the temperatures at the A2 section.

Similarly, it is possible to impregnating reinforced fiber with the resin uniformly by dividing the upper and lower molds 10, 20 in the length direction to define a plurality of divided sections and controlling the temperatures at the defined divided sections. Therefore, superior surface quality can be guaranteed and the resin impregnation ratio can be improved.

Figure 4:
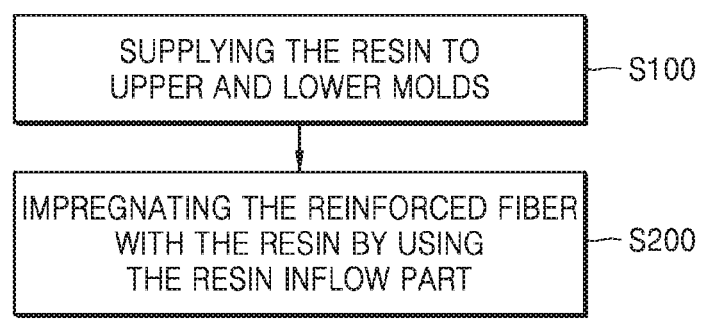
FIG. 4 is a flowchart which schematically illustrates the prepreg manufacturing method according to another embodiment of the present invention.

FIG. 4 is a flowchart which schematically illustrates the prepreg manufacturing method according to another embodiment of the present invention.

When referring to FIG. 4, the prepreg manufacturing method as shown includes a resin supply step S100, and resin impregnation step S200.

Resin Supply Step (S100)

This step is for supplying a resin, and corresponds to a step in which the resin is supplied from the extruder to each of the first resin inflow part and the second resin inflow part which are illustrated in FIG. 2 and FIG. 3.

As shown in FIG. 2, during this process which is different from conventional methods, the resin R is supplied to each of the first resin inflow part 110 of the upper mold 10 and the second resin inflow part 120 of the lower mold 20, such that the resin can be discharged uniformly on upper and lower portions of the reinforced fiber during subsequent processes.

Resin Ejection Step (S200)

This step is a resin discharge step, and corresponds to a step in which the resin is discharged uniformly from each of the first resin inflow part and the second resin inflow part toward the reinforced fiber which flows between the upper mold and the lower mold.

When referring to FIG. 2, the resin R, which has be introduced to the first resin inflow part 110 and the second resin inflow part 120 in the previous step, is discharged uniformly toward upper and lower surfaces of the reinforced fiber (not shown) which flows between the upper mold 10 and the lower mold 20.

Meanwhile, a temperature adjusting step can be additionally performed after this step.

The temperature adjusting step refers to a step in which temperatures at various sections are adjusted when the discharge amount of the resin R, which is discharged from the first resin inflow part 110 and the second resin inflow part 120, is not uniform throughout the length direction of the upper mold (or the lower mold).

For example, by referring to FIG. 3, when it is determined that the discharge amounts for the resins R1, R3, which are discharged at the A1 section and the A3 section of the first resin inflow part 110 and the second resin inflow part 120, are small, it is possible to increase the discharge amounts of the resins R1, R3, which are discharged at those sections, by increasing the temperatures at the A1 section and the A3 section.

Also, when it is determined that the discharge amounts for the resin R2, which is discharged at the A2 section of the first resin inflow part 110 and the second resin inflow part 120, is excessively large, it is possible to decrease the discharge amount of the resin R2, which is discharged at the corresponding section, by decreasing the temperatures at the A2 section.

Similarly, it is possible to impregnating the reinforced fiber with the resin uniformly by dividing the upper and lower molds 10, 20 in the length direction to define a plurality of divided sections and controlling the temperatures at the defined divided sections. Therefore, superior surface quality can be guaranteed and the resin impregnation ratio can be improved.

By using the prepreg manufacturing method which is configured as illustrated according to the another embodiment of the present invention, uniformity of a sheet surface is obtained as the resin is simultaneously discharged to upper and lower portions of the reinforced fiber.

More specifically, uniform quality of upper and lower portions of the sheet can be obtained since the reinforced fiber is positioned at a center of the height of the sheet.

As mentioned above, according to embodiments of the invention, a uniform resin impregnation can be acquired in an impregnation mold.

In addition, a vertical impregnation ratio deviation in the prepreg can be reduced.

As a result, physical properties of a continuous fiber reinforced composite material can be improved, and degradation in workability due to a fiber exposure can be prevented by improving quality of upper and lower surfaces of the prepreg.

Although the present invention has been explained by referring to the appended figures as in the above, it is to be noted than the present invention is not restricted to the embodiments and figures disclosed with this specification, and that various modifications can be made by the person having ordinary skill in the art within the scope of the technical spirit of the present invention. And, it is apparent that, although the advantageous effects according to the configuration of the present invention are not clearly written and described while explaining the embodiments of the present invention, any effect, which can be predicted by the corresponding configuration, can also be anticipated.

The invention claimed is:

1. A prepreg manufacturing device comprising:
   an impregnation mold having an upper mold a lower mold; and
   a temperature control part,
   wherein
   a first resin inflow part which is formed inside the upper mold, receives a resin supplied from an extruder, and discharges the resin to a reinforced fiber flowing to a lower part in the upper mold;
   a second resin inflow part which is formed inside the lower mold, receives the resin supplied from the extruder, and discharges the resin to the reinforced fiber flowing to an upper part of the lower mold,
   the first resin inflow part and the second resin inflow part have symmetrical shapes which face each other,
   each of the first resin inflow part and the second resin inflow part has a shape whose cross-section size at an outlet side where the resin is discharged is expanded compared to the cross-section size at an inlet side to which the resin is supplied from the extruder, and
   the temperature control part independently controls temperatures at a plurality of divided sections defined in a length direction for each of the first resin inflow part and the second resin inflow part.

2. The prepreg manufacturing device of claim 1, wherein each of the first resin inflow part and the second resin inflow part has a triangular cross-section shape.

3. The prepreg manufacturing device of claim 1, wherein the first resin inflow part and the second resin inflow part are connected with each other at the same time through a resin supply line which is branched off from the extruder.

4. A prepreg manufacturing method using the prepreg manufacturing device of 1, comprising:
   a step (a) in which a resin is supplied from the extruder to each of the first resin inflow part and the second resin inflow part;
   a step (b) in which the resin is discharged uniformly from each of the first resin inflow part and the second resin inflow part toward a reinforced fiber which flows between the upper mold and the lower mold, and
   a step (c) in which temperatures at a plurality of divided sections defined in a length direction for each of the first resin inflow part and the second resin inflow part are independently controlled.

* * * * *